United States Patent [19]

Geczy et al.

[11] E Patent Number: Re. 33,751

[45] Reissued Date of Patent: Nov. 26, 1991

[54] SYSTEM AND METHOD FOR CONTROLLED DIRECTIONAL DRILLING

[75] Inventors: Bela Geczy, Houston, Tex.; Frank DeLucia, Aberdeen, Scotland

[73] Assignee: Smith International, Inc., Houston, Tex.

[21] Appl. No.: 356,270

[22] Filed: May 23, 1989

Related U.S. Patent Documents

Reissue of:

[64] Patent No.: 4,667,751
Issued: May 26, 1987
Appl. No.: 786,817
Filed: Oct. 11, 1985

[51] Int. Cl.[5] ..... E21B 7/08

[52] U.S. Cl. ..... 175/61; 175/73; 175/75; 175/76

[58] Field of Search ..... 175/61, 73, 74, 75, 175/76

[56] References Cited

U.S. PATENT DOCUMENTS

| | | | |
|---|---|---|---|
| 1,954,166 | 4/1934 | Campbell . | |
| 2,175,620 | 10/1939 | Smith . | |
| 2,336,334 | 12/1943 | Zublin | 255/1.6 |
| 2,336,336 | 12/1943 | Zublin . | |
| 2,336,338 | 12/1943 | Zublin | 255/1.6 |
| 2,344,277 | 3/1944 | Zublin | 255/1.6 |
| 2,382,933 | 8/1945 | Zublin | 255/1.6 |
| 2,664,270 | 12/1953 | Zublin . | |
| 2,687,282 | 9/1954 | Sanders . | |
| 2,712,434 | 7/1955 | Giles . | |
| 2,745,634 | 5/1956 | Zublin . | |
| 2,829,864 | 4/1958 | Knapp . | |
| 2,891,769 | 6/1959 | Page . | |
| 3,042,125 | 7/1962 | Duncan . | |
| 3,045,767 | 7/1962 | Klassen . | |
| 3,160,218 | 12/1964 | Crake . | |
| 3,173,500 | 3/1965 | Stuart . | |
| 3,260,318 | 7/1966 | Neilson . | |
| 3,352,370 | 11/1967 | Livingston . | |

(List continued on next page.)

OTHER PUBLICATIONS

Gross, Ray H. "Gulf's Directional Drilling Technique"; *World Oil;* Nov. 1961.

Jenkins, Doug; "Directional Drilling Takes Giant Step"; *Canadian Petroleum;* Feb. 1966.

(List continued on next page.)

FOREIGN PATENT DOCUMENTS

| | | | |
|---|---|---|---|
| 0085444 | 8/1983 | European Pat. Off. . | |
| 1066514 | 10/1959 | Fed. Rep. of Germany . | |
| 3417743 | 3/1985 | Fed. Rep. of Germany . | |
| 3423465 | 5/1985 | Fed. Rep. of Germany . | |
| 593999 | 7/1970 | France . | |
| 2175620 | 10/1973 | France . | |
| 2369412 | 6/1978 | France | 175/61 |
| 294923 | 11/1971 | U.S.S.R. . | |
| 625430 | 11/1979 | U.S.S.R. . | |
| 636879 | 5/1950 | United Kingdom . | |
| 1388713 | 3/1973 | United Kingdom . | |
| 1483789 | 8/1977 | United Kingdom . | |

(List continued on next page.)

*Primary Examiner*—Terry L. Melius

*Attorney, Agent, or Firm*—Jeffrey W. Tayon; David A. Rose; William E. Shull

[57] ABSTRACT

A system and method for controlled directional drilling utilizes a system approach to design the hardware for drilling according to the well plan. The bend angle of a bent housing, connected between the bit and downhole motor, the diameter of a plurality of stabilizers and placement of the stabilizers with respect to the drill bit are selected and predetermined on the basis of the desired well plan. With the use of an MWD, the direction of the progressing borehole is tracked from the surface. Direction changes as required are controlled from the surface simply by controlling rotation of the drillstring. For curved path drilling, only the downhole motor is rotated, causing the borehole to travel along the curve determined by the bend angle in the bent housing and the diameter and location of the concentric stabilizers. When straight hole drilling is required, both the downhole motor and the entire drill string are rotated, effectively nullifying the effect of the bend angle in the bent housing.

36 Claims, 4 Drawing Sheets

U.S. PATENT DOCUMENTS

| | | | |
|---|---|---|---|
| 3,419,094 | 12/1968 | Bobo . | |
| 3,561,549 | 2/1971 | Garrison | 175/76 |
| 3,563,323 | 2/1971 | Edgecombe | 175/76 |
| 3,586,116 | 6/1971 | Tiraspolsky et al. | 175/74 |
| 3,667,556 | 6/1972 | Henderson | 175/73 |
| 3,713,500 | 1/1973 | Russell | 175/73 |
| 3,743,034 | 7/1973 | Bradley | 175/61 |
| 3,820,611 | 6/1974 | King | 175/57 |
| 3,841,420 | 10/1974 | Russell | 175/45 |
| 3,878,903 | 4/1975 | Cherrington | 175/45 |
| 3,903,974 | 9/1975 | Cullen | 175/17 |
| 3,930,545 | 1/1976 | Sears . | |
| 3,938,853 | 2/1976 | Jurgens | 175/325 |
| 4,015,673 | 4/1977 | Craig, Jr. | 175/61 |
| 4,067,404 | 1/1978 | Crase | 175/75 |
| 4,142,722 | 3/1979 | Driver | 175/95 |
| 4,185,704 | 1/1980 | Nixon, Jr. | 175/76 |
| 4,227,584 | 10/1980 | Driver | 175/95 |
| 4,240,512 | 12/1980 | Haglund | 175/75 |
| 4,261,425 | 4/1981 | Bodine | 175/106 |
| 4,267,893 | 5/1981 | Mannon, Jr. | 175/65 |
| 4,271,915 | 6/1981 | Bodine | 175/56 |
| 4,275,935 | 6/1981 | Thompson | 166/241 |
| 4,319,649 | 3/1982 | Jeter | 175/73 |
| 4,324,297 | 4/1982 | Denison | 175/45 |
| 4,394,881 | 7/1983 | Shirley | 175/76 |
| 4,440,241 | 4/1984 | Anders | 175/61 |
| 4,442,908 | 4/1984 | Steenbock | 175/74 |
| 4,485,879 | 12/1984 | Kamp et al. | 175/61 |
| 4,492,276 | 1/1985 | Kamp | 175/61 |
| 4,508,182 | 4/1985 | Anders | 175/61 |
| 4,577,701 | 3/1986 | Dellinger et al. | 175/73 |
| 4,632,193 | 12/1986 | Geczy | 175/65 |
| 4,674,580 | 6/1987 | Schuh | 175/325 |
| 4,697,651 | 10/1987 | Dellinger | 175/76 |
| 4,739,842 | 4/1988 | Kruger et al. | 175/61 |
| 4,874,045 | 10/1989 | Clayton | 175/325 |
| 4,965,147 | 8/1984 | Fennstra et al. | 175/73 |

FOREIGN PATENT DOCUMENTS

| | | |
|---|---|---|
| 1494273 | 12/1977 | United Kingdom . |
| 2017191A | 10/1979 | United Kingdom . |
| 2052609A | 1/1981 | United Kingdom . |
| 2059481 | 4/1981 | United Kingdom . |
| 2090891A | 7/1982 | United Kingdom . |
| 2121453 | 12/1983 | United Kingdom . |
| 2143879 | 2/1985 | United Kingdom . |

OTHER PUBLICATIONS

"Steering the Errant Bit"; *Drilling;* Jan. 1969.

Powell, Roy, "Turbodrill Assemblies for Deviation Control in the North Sea"; *Petroleum Engineer;* Sep. 1973.

MIT Publication Dates Jun. 25, 1975.

Millheim, Keith; "Operators Have Much to Learn about Directional Drilling"; *The Oil and Gas Journal;* Nov. 6, 1978.

Jage; Phillip, "ADMA Uses"; *The Oil and Gas Journal;* May 14, 1979.

Murray, Peter J. and Booth, Neil R.; "Directional Drilling on the Artic North Slope of Alaska"; *Society of Petroleum Engineers of AIME;* 1979.

"Straight-Hole Tubrodrilling"; 1982.

Hughes, Ron and Bayoud, Bruce; "Control Casing Wear with Downhole Motors", *The Oil and Gas Journal;* Jun. 7, 1982.

Feenstra, R. and Kamp, A. W.; "A Technique for Continuously Controlled Directional Drilling"; Feb. 9, 1984.

Feenstra, R. and Kamp, A. W.; "A Technique for Continuously Controlled Directional Drilling"; Feb. 9, 1984.

Feenstra R. and Kamp, A. W.; "Motor Aids Directional Drilling Accuracy", *Drilling Contractor;* Jun. 1984.

Letter dated Nov. 14, 1984 from Norton Canada Inc.

"Technical Description of Navigation Systems for Alternative Directional or Straight Hole Drilling"; 1984.

Yager, David; "Esso Drills World's Longest Horizontal Well:; *The Roughneck";* Jan. 1985.

Emery Maurice Myron; "Optimizing Results for Bent-Sub Drilling Applications"; *Drilling;* Feb. 1985.

Steenbock, Von A.; "A New Drainhole Drilling Tool"; *Erdoel-Erdgas;* Mar. 1985.

Karlsson, H.; Brassfield, T.; and Krueger, V.; "Performance Drilling Optimization"; SPE/IADC; 1985.

Kamp & Feenstra, "A Technique for Continuously Controlled Directional Drilling", IADC Conference in Dallas, Texas (Mar. 19-21, 1984).

(List continued on next page.)

Technical Description of Navigation Systems for Alternative Directional or Straight Hole Drilling.
Neyrfor Steerable Straight-Hole Turbodrill.
Summarized Results with Navigation Systems "Double Tilted U-Joint Housing".
Drilling Assembly Handbook; Drilco Division, Smith International, Inc.; 1977, 1982.
Weeden, Scott L.; "Recent Advances in Drilling Tools and Technology"; *Ocean Industry;* Jun. 1979.
Keene, Don and McKenzie, Don; "Deviation Tool Controls Bit Walk"; *Oil & Gas Journal;* Sep. 3, 1979.
Gretic, Zvonko; Tusek, Vladimir; Mihic, Branimir; Gajski, Zeljko; and Arndt, Fridrih; "Development of Geologically Complex Oil and Gas Deposits Using Directional Drilling"; *NAFTA Broj;* Sep.-Nov. 1979.
Burger, E. and Rischmuller, W.; "The Vorderriss-1 Well from a Drilling Engineering Viewpoint"; *Erdoel Erdgas Zeitschrift;* Oct. 1979 (In German).
McReynolds, Lori; "Contractor 'Drills' Pipelines"; *Drilling Contractor;* Apr. 1980.
Burger, E. and Winkler, K.; "Methods and Applications of Directional Drilling"; *Erdoel Erdgas Zeitschrift;* Apr. 1980 (In German).
Leonard, Jeff; "Refined Offshore Drilling Systems Expand Technology"; *World Oil;* Jul. 1980.
Brittenham, Terry; Williams, R. Edward; Rowley, John C.; and Neudecker, Joseph W.; "Directional Drilling Operations Hot Dry Rock Well EE-2"; *Geothermal Resources Council, Transactions;* Sep. 9-11, 1980.
Brittenham, Terry; Williams, R. Edward; Rowley, John C.; and Neudecker, Joseph W.; "Directional Drilling Equipment and Techniques for Deep, Hot Granite Wells"; *Society of Petroleum Engineers of AIME, Paper No. 9227;* Sep. 21-24, 1980.
"IPF's Remote-Controlled Bent Sub"; *Petrole Informations;* Dec. 11, 1980.
Durand, L. J.; Samhouri, F. A.; and Barthe, D. L.; "Kicking Off in Large Diameter Holes"; *Society of Petroleum Engineers of AIME, Paper No. 9649;* Mar. 9-12, 1981.
Le Peuvedic, J.; "Bottom-Hole Measuring Equipment"; *Petrole et Techniques;* Dec. 1981 (In French).
Marshall, Gailen; "Downhole Tools Meet Deepsea Demands"; *Offshore;* Jun. 5, 1981.
Marshall, Gailen; "Directional System Reduces Drilling Time"; *Petroleo Internacional;* Aug. 1981 (In Spanish).
Emery, Maurice Myron and Luker, Stanley; "Planning and Executing a Straight-Hole Mud-Motor Drilling Program"; *Oil & Gas Journal;* Sep. 28, 1981.
Desbrandes, R.; "New Developments in Directional Drilling"; *Petrole Informations;* Nov. 26, 1981 (In French).
"Directional Drilling Techniques Updated"; *Oil and Gas Digest;* Nov. 1981.
Sidman, Robert D.; "Calculator Routines Correct Hole Angles"; *Drilling Contractor;* Jan. 1982.
"IFP Measuring While Drilling System (MWD)"; *L'Industrie du Petrole;* Apr. 1982 (In English and French).
Striegler, John H.; "Horizontal Drainhole Drilling Update"; *Ann. API Prod. Dep. Mtg., Paper No. B;* Apr. 4-7, 1982.
Teys, Ray; "Directionally Controlled Drilling and Side Tracking"; *Geothermal Resources Council, Geothermal Well Drilling & Completion Workshop;* May 24, 1982.
Mitra, A. K.; Oganov, S. A.; Garg, H. S.; and Mahanti, A. C.; "Directional Drilling"; *Institute of Drilling Technology, Oil and Natural Gas Commission, Bulletin;* Jun. 1982.
Desbrandes, R. and Morin, Pierre; "Advances in Remote-Controlled Drilling"; *Journal of Canadian Petroleum;* Nov.-Dec. 1982.
Desbrandes, R. and Morin, Pierre; "Recent Developments in Remotely Controlled Drilling"; *Revue de L'Institut Francais du Petrole;* Jan.-Feb. 1983 (In French).
Emery, Maurice Myron; "Optimizing Motor Drilling System"; *IADC/SPE Paper 11404;* Feb. 20-23, 1983.
Boulet, J. G.; Morin, P. E.; Laval, E. J.; and Bosch, J. R.; "The New Remote-Controlled and Multiangle Bent Sub (Telepilote) for Drilling Trajectory Control and Corrections"; *IADC/SPE Paper 11384;* Feb. 20-23, 1983.
Boulet, Jean; "The Telepilote"; *Petrole Informations;* Mar. 25, 1983.
Dorel, Marc; "Horizontal Drilling Methods Proven in Three Test Wells"; *World Oil;* May 1983.
Boulet, J. G. and Morin, P. E.; "The New Remote--Controlled and Multiangle Bent Sub (Telepilote) for Drilling Trajectory and Corrections;38 ; *Society of Petroleum Engineers of AIME, Offshore Europe Conf.;* Sep. 6-9, 1983.
Horne, Brad; De Lucia, Frank; and Emery, Myron; "Optimizing Long Interval Mud Motor Applications-Offshore Canada"; *Canadian Offshore Drilling & Downhole Technology Conference;* Sep. 12-14, 1983.

Palm, Jim; "Ricks Exploration Counters Crooked-Hole Tendency to Speed Drilling"; *Oil & Gas Journal;* Nov. 21, 1983.

Pine, Mel; "Extended Reach Drilling"; *Mobil World;* Nov.-Dec. 1983.

Enen, Jack; Callas, N. P.; and Sullivan, Wayne; "Rig Site Computer Optimizes Bit Weight"; *Oil & Gas Journal;* Feb. 13, 1984.

Horne, Brad; De Lucia, Frank; and Emery, Myron; "Optimizing Long Interval Mud Motor Applications"; *Canada Offshore Report;* Mar. 19, 1984.

Fox, J. P. and Wood, J. E.; "PDC Bits Find Application in San Joaquin Valley"; *Society of Petroleum Engineers of AIME, Paper No. 12790;* Apr. 11-13, 1984.

"A>Hole Control; Computer Helps Fine Tune Drilling Assemblies for Precise, Low Cost Control of Hole Course"; *Drilling;* Apr. 1984.

Cunningham, William; "Selecting the Proper Stabilizer"; *The Digest;* Jul. 1984.

MacDonald, R. R.; "Drilling the Cold Lake Horizontal Well Pilot No. 2"; *Society of Petroleum Engineers of AIME, Paper No. 14428;* Sep. 22-25, 1985.

Newton, R., et al.; "A Case Study Comparison of Wells Drilled With or Without MWD Directional Surveys on the Claymore Platform in the North Sea," pp. 1867-1876, *Journal of Petroleum Technology,* Nov. 1980.

Gearhart, M., et al.; "Mud Pulse MWD Systems Report," pp. 2301-2306, *Journal of Petroleum Technology,* Dec. 1981.

Durand, L. J.; "Kicking Off in Lare-Diameter Holes," pp. 2377-2384, *Journal of Petroleum Technology,* Oct. 1982.

Feenstra, R. and Kamp, A. W.; "Techniques for Continuously Controlled Directional Drilling," pp. 11-27, 1984, Drilling Tech. Conference.

DeLucia, F. V. and Herbert, R. P.; "PDM vs. Turbodrill: A Drilling Comparison," pp. 17-23, SPE 13026, Sep. 16-19, 1984.

Bradley, W. B.; "Factors Affecting the Control of Borehole Angle in Straight and Directional Wells," pp. 679-688, *Journal of Petroleum Technology,* Jun. 1985.

Brassfield, T. and Karlsson, H.; "Drill Faster, More Accurately with New Navigation System," pp. 38-40, *World Oil,* Aug. 1, 1985.

"Crooked Holes and How to Help Them Go Straight," J. W. Spear and G. H. Holliday, *Oil and Gas Journal,* Aug. 1955.

"New Packed Hole Tool Combats Hole Deviation," Chad Wiley, *Drilling,* pp. 62-75, Jun. 1965.

"Proper Application of Directional Tools Key to Success," Keith Millheim, *Oil and Gas Journal,* pp. 156-158, 161-162, Nov. 20, 1978.

"Single-Stabilizer Behavior Described," Keith Millheim, *Oil and Gas Journal,* Dec. 18, 1978.

"Behavior of Multiple-Stabilizer Bottom-Hole Assemblies," Keith Millheim, Oil and Gas Journal, Jan. 1, 1979.

"Improved Directional Drilling Will Expand Use," MacDonald, et al., Oil and Gas Journal, pp. 108-113, 120, Feb. 26, 1979.

SYSTEM AND METHOD FOR CONTROLLED DIRECTIONAL DRILLING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to improvements in controlled directional drilling systems and more particularly pertains to a new and improved system and method for controlling the directional drilling of the borehole in a manner which will allow the borehole to be drilled in conformance with the proposed well plan.

2. Description of the Prior Art

In the field of controlled directional drilling of boreholes, until very recently, it had been the practice to use two separate down-hole systems. One system was used for drilling straight holes. A completely different system was used for causing the borehole to turn direction. The use of these two systems required that the entire drillstring be tripped or pulled from the borehole so that the down-hole system could be changed each time a change of direction was required. This type of system is described in SPE Paper No. 9649 entitled "Kicking Off in Large Diameter Holes" presented at the 1981 SPE Middle East Oil Technical Conference held in Manama, Bahrain, Mar. 9–12.

Although such systems produced results, they were unsatisfactory in several major respects. Considerable time was wasted as a result of the non-drilling activity occasioned by having to trip the bottom-hole assembly, either to follow the curvature in the well plan or to make corrections for unforeseen deviations in the borehole. This type of operation considerably increased the drilling time and decreased the rate of penetration (ROP). Another problem with this system is that the standard straight-hole drilling, bottom-hole assemblies utilized, deviated, sometimes considerably, from the well plan. In such a case, not only will the driller not reach his target but he will end up with a crooked hole, worn casing, stuck pipe, and expensive fishing jobs.

Deviating boreholes have been a subject of concern to this industry for a long time. Many approaches have been tried to first understand the multifacet problem and then to come up with a workable solution. One example of such an approach can be found in SPE Article No. 5070 entitled "Factors Affecting the Control of Borehole Angle in Straight and Directional Wells" presented at the SPE-AIME 49th Annual Fall Meeting in Houston, Tex., Oct. 6–9, 1974.

One of the problems confronting the industry with respect to the drilling of directional boreholes and deviation of boreholes from a well plan was obtaining arcurate information about the direction of the borehole. As a result, the industry developed systems for monitoring while drilling (MWD systems). In order to be able to ascertain when a borehole is deviating from its well plan and to be able to ascertain and control the direction of the borehole in order to follow the well plan, many different types of monitoring systems were developed.

A certain number of these systems are discussed, for example, in SPE paper No. 9224, entitled "A Case Study Comparison of Wells Drilled With and Without MWD Directional Surveys on the Claymore Platform in the North Sea" first presented at the SPE 55th Annual Technical Conference and Exhibition in Dallas on Sept. 21–24, 1980. Another example can be found in SPE paper No. 10053 entitled "Mud Pulse MWD Systems Report" first presented at the SPE 56th Oct. 4–7, 1981.

Another aspect of the problem confronting anyone attempting to drill a directional well at increased ROP without increasing cost, was the requirement of a powerful down-hole motor to turn the borehole, when required by the well plan, or to bring a deviated borehole back to the well plan. Such motors have been the focus of industry attention for considerable time and are now, to a reasonable extent, available. A description of a type of down-hole motor available at the present time can be found in SPE paper No. 13026 entitled "PDM vs. Turbodrill: A Drilling Comparison", presented at the 59th Annual Technical Conference and Exhibition in Houston, Tex. Sept. 16–19, 1984.

Even with all of these available pieces of a bottom hole assembly, the procedure for drilling a directional well was still to trip the drill string when a change in the direction of the borehole was called for by the well plan. In spite of the ability to monitor while drilling the direction of the borehole, the use of powerful downhole motors, and the ability to modify various factors like bit weight while the bottom-hole assembly was in the hole, boreholes still deviated from the well plan, requiring tripping of the drillstring and adjustment of the bottom-hole assemblies, as well as adjustment of the stabilizers on the drillstring. A method was needed which would considerably reduce, if not eliminate entirely, the round trips required with kick-off techniques and assembly changes for directional control of the borehole. A technique which shows promise and is currently being utilized by various operators in the industry is described in a paper by A. W. Kamp and R. Feenstra entitled "A Technique for Continuously Controlled Directional Drilling" presented at the Drilling Technology Conference of the International Association of Drilling Contractors in Dallas, Tex. on Mar. 19–21, 1984. The technique involves the use of a powerful down-hole motor and various ways of creating a side force on the bit or tilting the axis of the bit with respect to the axis of the borehole. It has been found that the bit will drill straight when both the drill string and the motor are rotated, and the bit will deviate in a desired direction when only the motor is rotated and the drillstring is kept stationary in a controlled tool face direction.

Since the introduction of this technique, various entities in this industry have developed a variety of bottom-hole assemblies to take advantage of its possibilities. Some systems have proven more promising than others. Each system in its own way, is searching for a reduction in drilling time by increasing rate of penetration and thereby reducing the cost of the well. One such system is described in an article entitled "Drill Faster, More Accurately With New Navagation System" published in World Oil on Aug. 1, 1985 and authored by T. Brassfield and H. Karlson.

The present invention is an improvement over the systems presently available and being tried by the industry to increase ROP of a directional well. The improved performance of the present invention is based on the fact that an overall system approach to each drilling job is utilized. In other words, the bottom-hole assembly is uniquely tailored for each proposed well plan by taking into consideration a myriad of facts such as hole condition, pump data, type of mud being utilized, type of formation being drilled, drilling assembly components, drilling flow rate, well plan, i.e. direction of the borehole after deviating from vertical, in addition to information about the drilling bit which includes bit size, bit type, bit pressure drop, and gauge length, as well as degrees of offset of the center line of the bit face from the center line of the borehole. This information is utilized according to the present invention to come up with a bottom hole assembly and method of building a bottom hole assembly which provides an ROP for directional wells which is considerably higher than was heretofore possible.

SUMMARY OF THE INVENTION

A system approach to the design of a down-hole assembly for directional drilling requires establishing the value for a series of important variables on the basis of the proposed well plan. The major variables which are systematically determined are bit offset from center, determined by the angle of bend in a bent housing located between the motor and the bit, exact placement along the drillstring of a plurality of concentric stabilizers with respect to the bit, diametric size of each concentric stabilizer with respect to the diameter of the borehole, and to a lesser degree weight on the bit. The entire system, when assembled for a particular well plan is capable of following that well plan with only slight directional correction in the borehole. Directional corrections are made and control of the system is maintained by rotating the down-hole motor only, for curved travel of the drillstring, and rotating the motor and drill string together for straight travel of the drillstring.

BRIEF DESCRIPTION OF THE DRAWINGS

The objects and many of the attendant advantages of this invention will be readily appreciated and become readily apparent as the same becomes better understood by reference to the following detailed description, when considered in conjunction with the accompanying drawings, and in which like reference numerals designate like parts throughout the figures thereof and wherein.

DESCRIPTION OF THE PREFERRED EMBODIMENT

Figure 1:
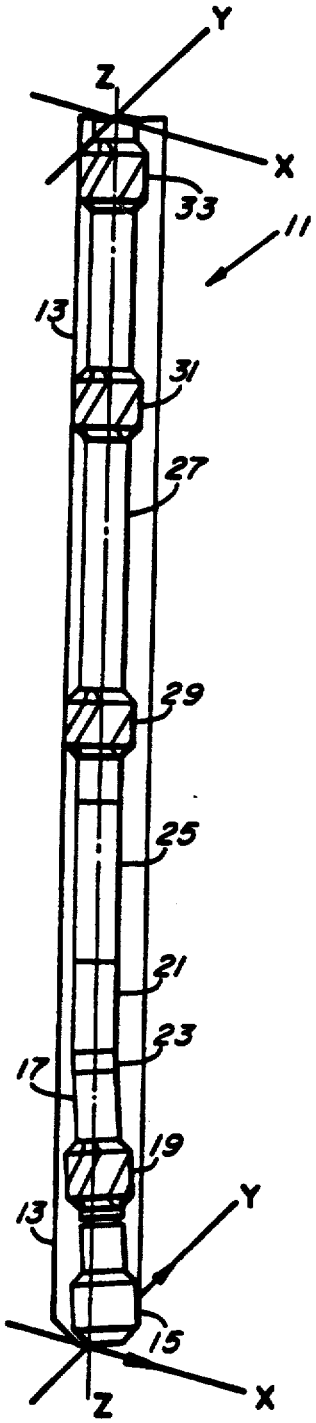
FIG. 1 is a diagramatic illustration of the basic components of the bottom-hole assembly of the present invention.

Referring first to FIG. 1, the basic components of the bottom hole assembly 11 of the present invention are illustrated. The borehole 13 is shown in an oversized and exaggerated manner and is illustrated as being capable of moving in three dimensional space as defined by the Cartesian coordinates x, y and z. The z axis is for the purposes of illustration, defined as the center line of the borehole 13.

The first element of the bottom-hole assembly of the present invention is the drill bit 15 which is connected to a shaft that is concentrically located within a bearing assembly 17. This shaft is in turn connected through a bent housing 21 to the output shaft of the down-hole motor 25. The housing of the down-hole motor 25 is in turn connected to the drill string casing 27 which extends all the way to the surface of the borehole 13 and is in turn connected to a means for rotating the entire assembly from the surface (not shown). The bottom-hole assembly, according to the present invention, also includes at least three and preferably four stabilizers 19, 29, 31 and 33 precisely located along the drill string with respect to the drill bit 15 and with respect to each other.

An important thing to remember with respect to the illustration of FIG. 1 is that the centerline of the bit 15 is offset from the centerline of the borehole 13 in an amount determined by the offset 35 (FIG. 2) which is fixed by the bent housing 21, 23 that is connected between the down-hole motor 25 and the motor bearing assembly 17. The utilization of a bent housing 21 at this precise point in conjunction with the concentric stabilizers as shown in FIG. 1 has proven to be a major factor in increasing the rate of penetration of this particular bottom-hole assembly beyond that heretofore available.

Figure 2:
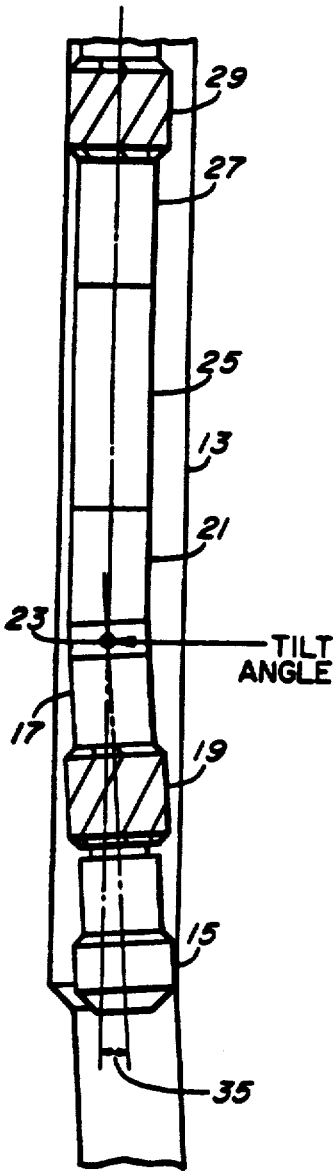
FIG. 2 is a diagramatic illustration showing how the bit offset is obtained in the bottom-hole assembly according to the invention.

Referring now to FIG. 2, the bit offset created by the bent housing 21, 23 is illustrated in more detail. FIG. 2 illustrates the turning mechanism of the bottom-hole assembly built according to the present invention. This turning mechanism includes the bent housing 21, 23 having a specific tilt angle 35 and a concentric stabilizer 19 located down-hole of the tilt point 23 on the bent housing 21, 23, and very close to bit 15 on bearing housing 17. The drive shaft for bit 15 is concentric within bearing housing 17, resulting in an offset 35 of the center of the face of the bit 15 from the centerline of the borehole 13 by an angle $\alpha$ which is the tilt angle 35 of the bent housing 21.

The down-hole motor 25 utilized with this type of arrangement is preferably a positive displacement motor of the type described in the SPE paper No. 13026 entitled "PDM Versus Turbo-Drill: A drilling comparison". The concentric stabilizer 19 located close to the bit 15 serves mainly to maintain the bit offset angle 35 by minimizing the deflections which might increase or decrease this offset angle.

Although all the elements of the bottom-hole assembly, as shown in FIG. 1 of the present invention, affect the direction of the borehole that will be drilled by the bottom-hole assembly, it is convenient to consider the bearing stabilizer 19 and the bent housing 21, 23 as the key factors in determining the extent to which the borehole will deviate from the vertical. Experience and mathematical modeling have in fact born out this analytical simplification.

Figure 3:
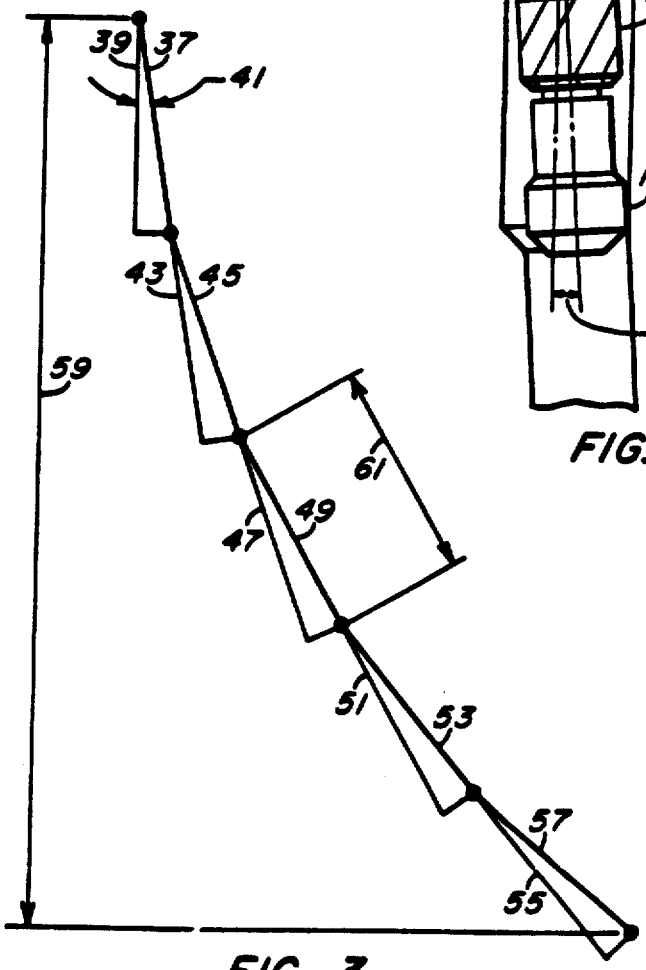
FIG. 3 is a vector illustration showing how the bottom hole assembly, of the present invention drills in a controlled direction.

Referring now to FIG. 3, a curve which is made up of a plurality of segments 37, 45, 49, 53 and 57 is illustrated as the curve along which the bottom-hole assembly of the present invention will travel as determined by the elements of the bottom-hole assembly including bearing stabilizer 19 and the other stabilizers making up the bottom-hole assembly. The bottom most three stabilizers can be thought of as defining points on a circle which determine the radius of the circle. A portion of the circumference of this circle is illustrated in FIG. 3 as the path of travel of the bottom-hole assembly. The vertical distance 59 for the curved path traveled is for convenience considered to be a segment of 100 feet.

The initial deviation from vertical 39 of curved segment 37 is determined by the bit offset 41 which is controlled by a tilt angle of bent housing 21, 23. The bit 15 will travel along this offset path 37 for a length 61 which is approximately equal to the length of the bearing assembly 17. Whereupon the bit will again follow its offset 41 to drill the next straight segment 45 rather than continue straight along segment 43, and so on to segments 53 and 57. The composite result is a curved path which deviates from the original vertical 39 by a total angle in degrees which is related to the angle of offset 41 created by the tilt angle in bent housing 21, 23.

Referring once more to FIG. 1, the bearing stabilizer 19 and the bent housing 21, 23 is considered the part of the overall system which gives the bottom-hole assembly the capability of turning left or right in a controlled manner. The three concentric stabilizers 19, 29 and 31 and, preferably the fourth concentric stabilizer 33 can be considered as the part of the bottom-hole assembly which gives the assembly the ability to maintain a straight course, or to build or drop angle. Thus, the bottom-hole assembly of the present invention is really a unique combination of two overlapping systems which are integrated to provide the bottom-hole assembly with its unique performance capabilities.

The selection of the diameter and placement of the concentric stabilizers 19, 29, 31 and 33, as well as the tilt angle $\alpha$ of the bent housing 21, 23 are the key factors in determining the performance of the bottom-hole assembly of the present invention.

Figure 4:
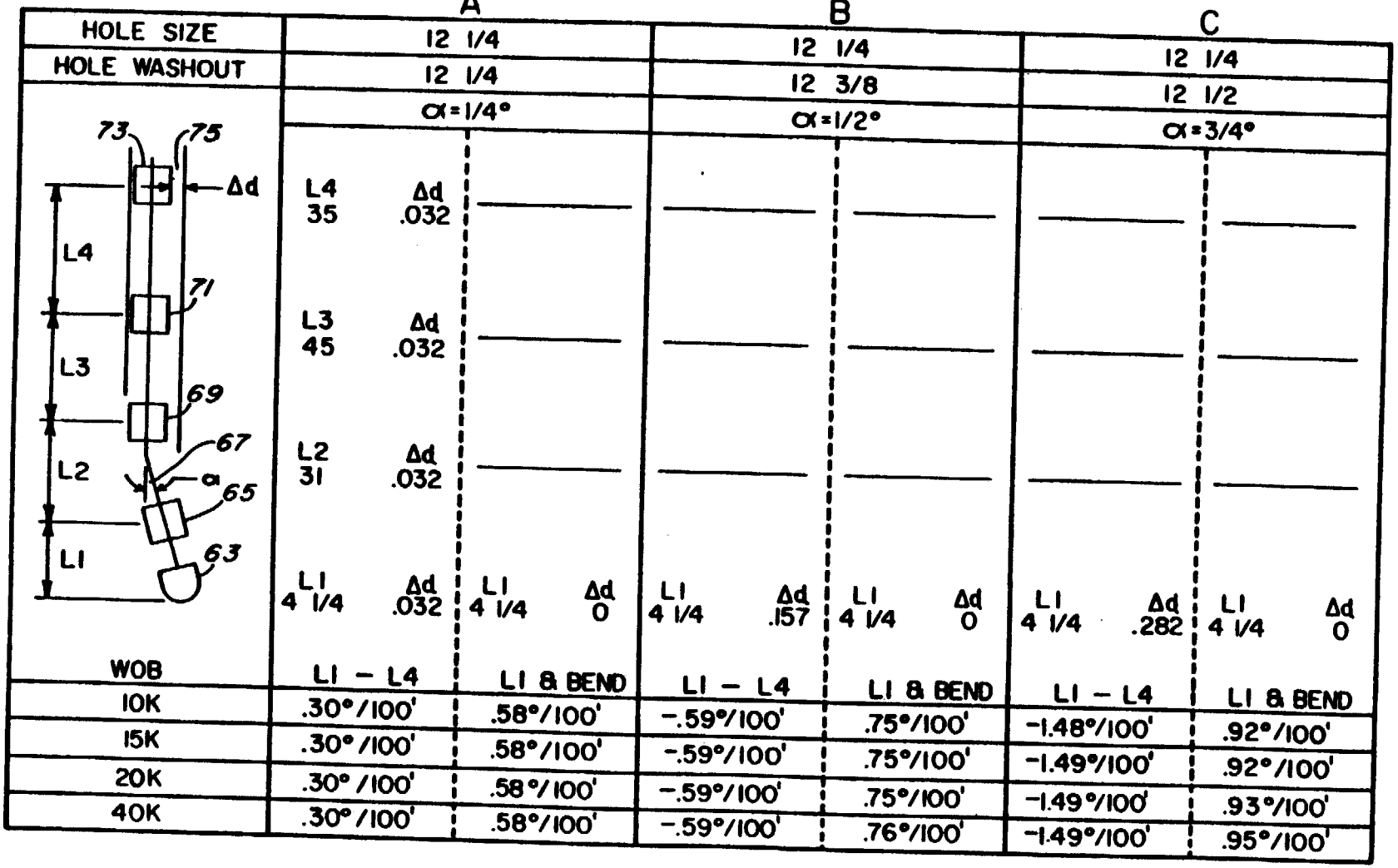
FIG. 4 is a table and component diagram for a bottom-hole assembly built according to the present invention illustrating the interrelationship of the basic components of the bottom-hole assembly.

As a result of mathematical modeling with the aid of a computer and field experience, it has been possible to come up with a definition of the interrelationship between the stabilizers and the offset angle $\alpha$ of the bent housing in order to achieve a specific drilling direction. FIG. 4 illustrates one such set of relationships.

The basic down-hole assembly components are the drill bit 63, the concentric stabilizers 65, 69, 71 and 73, and the bent housing 67, having an offset angle $\alpha$. Performance of this bottom-hole assembly, is changed by varying the distance of each stabilizer from the bit 63. That is the distance L1 of stabilizer 65 from bit 63, the distance L1+L2 of the stabilizer 69 from the bit 63, the distance L1+L2+L3 of the stabilizer 71 and the distance L1+L2+L3+L4 of the stabilizer 73 from the bit 63. The angle $\alpha$ is an important contributing factor, as well as the amount of undersize $\Delta d$ 75 of each stabilizer with respect to the hole size. The amount of weight on bit (WOB) is a factor, as are various other variables mentioned above, to a minor extent.

Consider now various examples of bottom-hole assemblies which for convenience are designated as assemblies A, B and C. Considering first assembly A, the hole size is given as 12¼ inches. Hole washout, as a result of the bottom-hole assembly will be negligable. This bottom-hole assembly utilizes a bent housing which has a bit offset angle $\alpha$ of ½ of a degree. The placement of the four stabilizers is as follows. The bearing stabilizer 65 is located a distance L1 from the bit which is equal to 4½ feet. Stabilizer 69 is located a distance L2 from the stabilizer 65 which is a distance of 31 feet. Stabilizer 71 is located a distance L3 from stabilizer 69 which is a distance of 45 feet. Stabilizer 73 is located a distance L4 from stabilizers 71 which is a distance of 35 feet. Each of the stabilizers are concentric and undersized with respect to the hole diameter an amount $\Delta d$ which is equal to 0.032 inches. The location of the four stabilizers 65, 69, 71 and 73 at these specific distances with respect to the bit 63 has been found to create a system that will build 0.30 degrees per 100 feet regardless of the variation of the weight on bit from 10,000 pounds to 40,000 pounds.

Looking now at the bearing concentric stabilizer 65 and the offset angle $\alpha$, this combination causes the bottom-hole assembly to build angle at 0.58 degrees per 100 feet. As a result, the system, when being utilized in a directional drilling mode, will build angle at 0.88 degrees per 100 feet. It can be seen that prior to putting this bottom-hole assembly into the ground, its performance in the directional mode can be fairly accurately predicted.

Looking now at bottom-hole assembly B, we can see that changing just 2 parameters creates a different directional characteristic. Bottom-hole assembly B has an offset angle $\alpha$ of half a degree and utilizes a bearing stabilizer 65 which is undersized by 0.157 inches. All the other parameters remain the same. The four stabilizers thereby provide a bottom-hole assembly which drops angle at 0.59 degrees per 100 feet. The bent housing and bearing stabilizer causes the bottom-hole assembly to build angle by 0.75 degrees per 100 feet. The resulting overall system will therefore build angle by 0.16 degree per 100 feet when in the directional mode.

Referring to bottom-hole assembly C, again we change the offset angle $\alpha$ and the undersize differential of the bearing stabilizer 65. The angle $\alpha$ is chosen to be ¾ of a degree and the bearing stabilizer 65 is undersized by 0.282 inches. As a result, the characteristic of the stabilizer string is to drop angle by 1.48 degree per 100 feet, up to 1.49 degrees per 100 feet, if the weight on bit is increased from 10,000 pounds. The bent housing and bearing stabilizers 65 will build angle at 0.92 degrees per 100 feet, up to 0.95 degrees per 100 feet if the weight on bit is increased to 40,000 pounds. Accordingly, the combination results in a directional bottom-hole assembly which will drop angle at 0.56 degrees per 100 feet.

Figure 5:
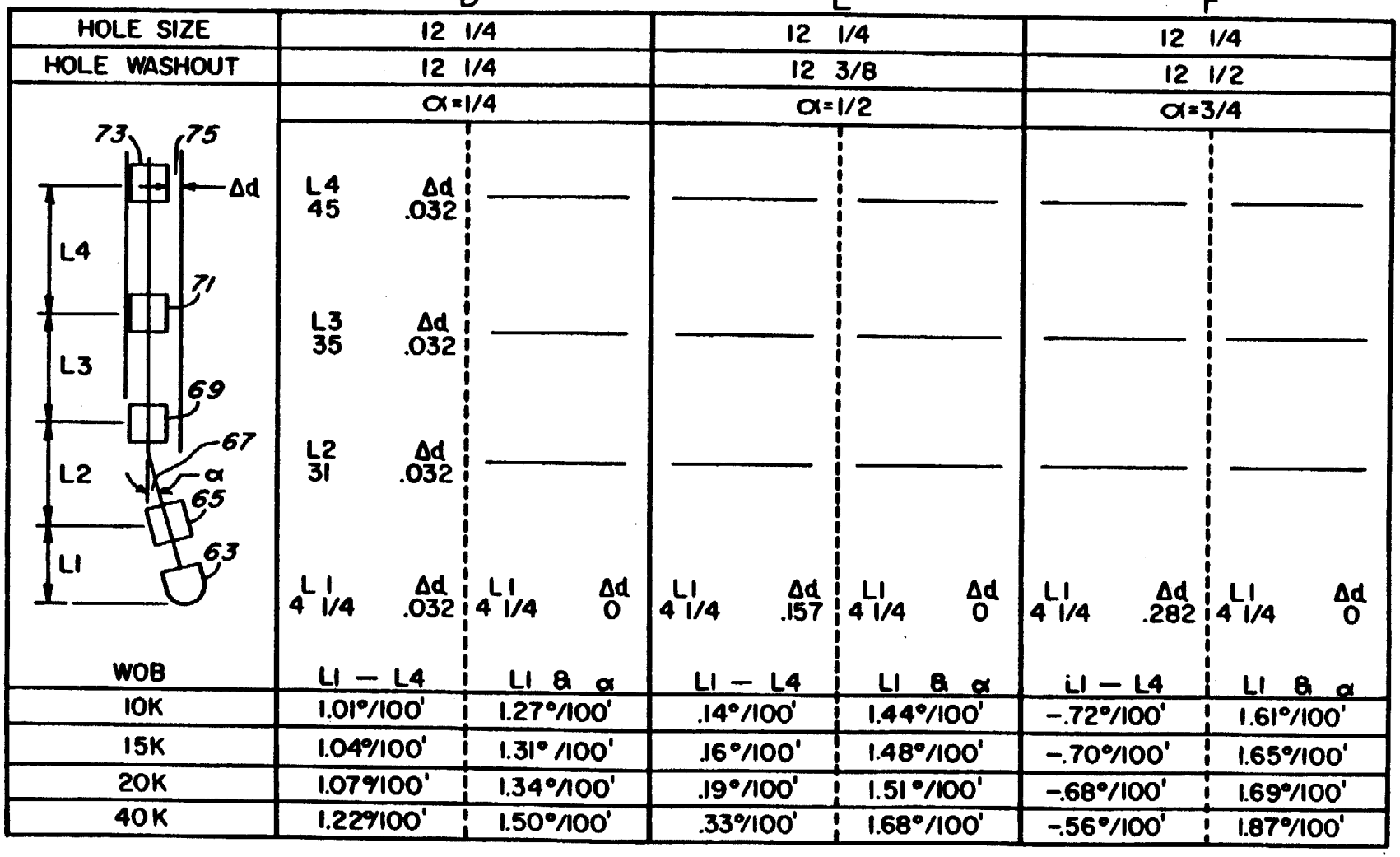
FIG. 5 is an alternate table and diagram illustrating a different relationship between the basic components of the bottom-hole assembly of the present invention.

FIG. 5 illustrates three more bottom-hole assemblies D, E and F. The bottom-hole assembly D, utilizes an offset angle $\alpha$ of a quarter of a degree and stabilizer spacing of L1—4½ feet, L2—31 feet, L3—35 feet, and L4—45 feet, with an undersized diameter differential $\Delta d$ of 0.032 for each of the concentric stabilizers. This system is shown to build angle at 1.01 degrees per 100 feet up to 1.22 degrees per 100 feet as the weight on bit is increased to 40,000 pounds. The bent housing and bearing stabilizer 65 will cause the bottom-hole assembly to build angle by 1.27 degrees per 100 feet up 1.50 degrees per 100 feet as the weight-on bit is increased to 40,000 pounds. As a result, the bottom-hole assembly D will build angle from 2.28 degrees per 100 feet to 2.72 degrees per 100 feet depending upon the amount of weight-on bit.

The bottom assembly E is shown as utilizing an offset angle $\alpha$ of ½ a degree and a $\Delta d$ for bearing stabilizer 65 of 0.157 inches. All other variables remain the same. The stabilizer section of the bottom-hole assembly, as a result, will build angle at 0.14 degrees per 100 feet up to 0.33 degrees per 100 feet, depending upon the weight on a bit. The bent housing portion of the bottom-hole assembly will tend to build angle at 1.44 degrees per 100 feet up to 1.68 degrees per hundred feet depending on the weight on bit. The overall system will tend to drill directionally at 1.58 degrees per 100 feet up to 2.01 degrees per 100 feet depending upon the weight on the bit.

Looking now at system F, the bent housing used has an offset angle $\alpha$ of ¾ of a degree and a $\Delta d$ undersized bearing stabilizer 65 at 0.282 inches. All other variables remain the same. As a result, the stabilizer section will drop angle from 0.72 degrees per 100 feet to 0.56 degrees per 100 feet depending on weight on bit. The bent housing will tend to build angle at 1.61 degree per 100 feet to 1.87 degree per 100 feet. The combination will drill directionally to build angle of 0.89 degrees per 100 feet up to 1.31 degrees per 100 feet depending upon weight on bit.

The particular down-hole system chosen, A, B, C, D, E, or F, or any other system, will depend upon a proposed well plan directed by the customer. A typical well plan is shown in FIG. 6 where the borehole is drilled vertically for approximately 1,850 feet from the surface 77, at which point it is kicked off and then drilled at a certain angle to a vertical depth of 6,300 feet and an angle depth of 7,970 feet.

Figure 6:
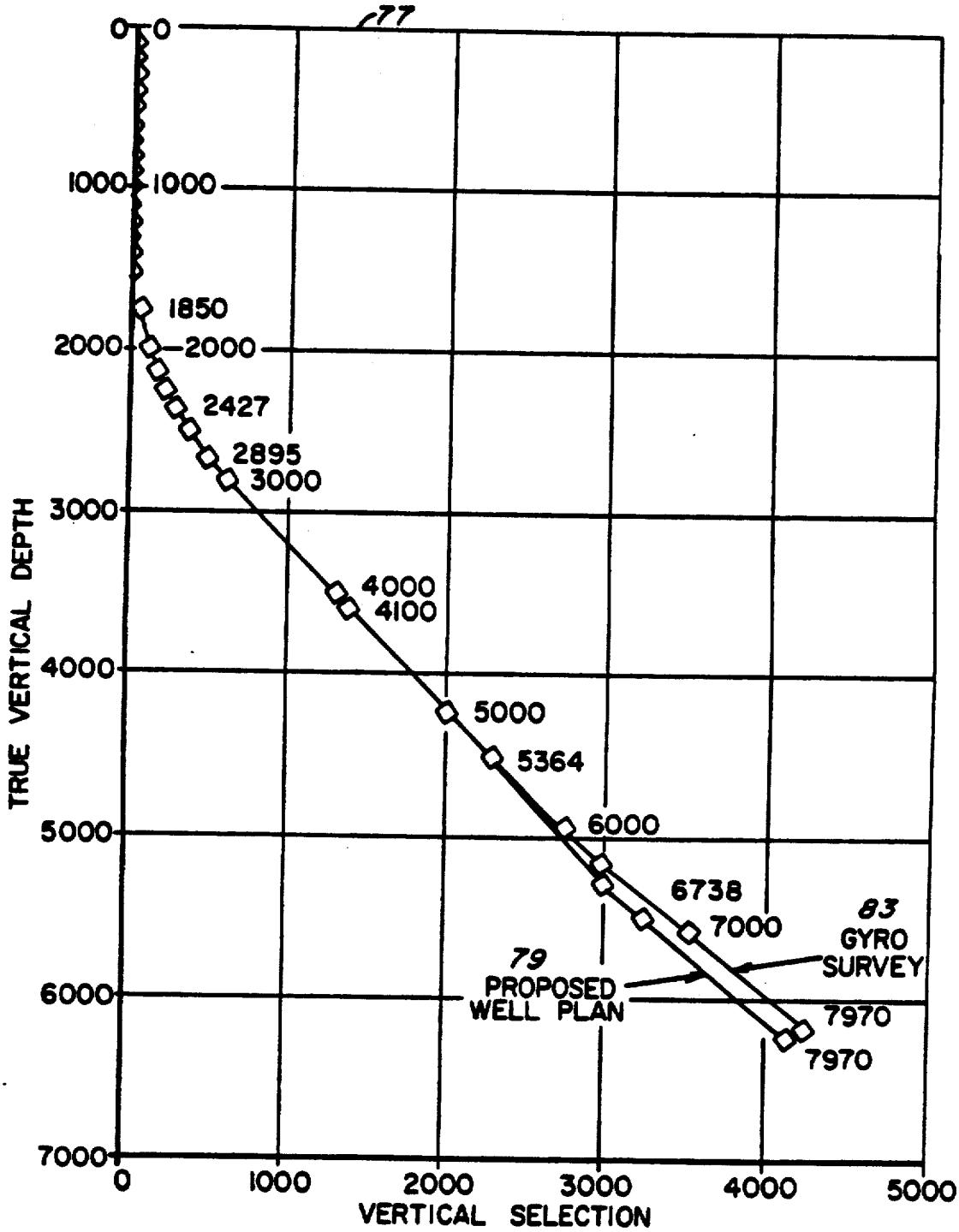
FIG. 6 is a vertical section of a borehole showing the accuracy with which the actual borehole follows the proposed well plan.

The bottom-hole assembly of the present invention is assembled at the surface with the concentric stabilizers located at distances L1, L2, L3, and L4 and having a differential undersize as specified, and a specific offset angle $\alpha$ to accomplish the kickoff at 1,850 feet and follow the well plan as shown in FIG. 6. For straight hole drilling from ground level 77 to the 1,850 foot depth, both the down-hole motor and the drillstring are rotated together. Rotation of the drillstring nullifies the directional characteristic built-in to the down-hole assembly. At the 1,850 foot mark, where kick-off is required, only the down-hole motor is rotated causing the down-hole assembly to take on its full directional characteristic, kick-off and follow the well plan. Once complete kickoff is established, the drillstring can again be rotated if the down-hole assembly starts to build too great an angle. In this way the down-hole assembly is steered to its target. The result, as the curves of FIG. 6 illustrate, is that the gyrosurvey data 83 is almost overlaying the proposed well plan 79.

The actual results of the bottom-hole assembly of the present invention were surprising as is evident from this example. The well plan required that the downhole assembly maintain 43 degrees per 56 feet of deviation angle from a depth of 3,077 feet to a depth of 7,216 feet in an 8½ inch hole. The bottom-hole assembly of the present system was used with an offset angle of ½ degree. The average rate of penetration of the bottom-hole assembly was 103.5 feet per hour. The rate of penetration while drilling was 147 feet per hour which reached up to 330 feet per hour. The system hit the target 6 feet under average angle and 40 feet to the right. Total cost savings was $112,500 as a result of being ¾ of a day ahead of schedule.

As can be seen from this example, by taking a systems approach to the bottom-hole assembly to be used in directional drilling and specifically designing the bottom-hole assembly for a particular well plan in the manner illustrated and according to the present invention, the ROP can be increased considerably, resulting in significant savings per well.

What is claimed is:

1. An improved system for controlled directional and straight drilling of a borehole wherein the entire drillstring is rotatable from the surface, including a bottom-hole assembly comprised of a drill bit connected to the output shaft of a downhole motor for independent rotation from the drillstring, said motor connected at its uphole end to the drillstring, the improvement in the bottomhole assembly, comprising:

a first, concentric stabilizer, having a preselected diameter slightly smaller than the diameter of the borehole, mounted between the drill bit and motor at a preselected distance from the bit around the output shaft of said downhole motor, said shaft being concentrically located therein;

a [heat] *bent* motor housing connected to the downhole end of said downhole motor that has a bend from its geometric center at a predetermined angle $\alpha$ at its downhole end, thereby offsetting the centerline of said first stabilizer and the centerline of the drill bit face from the borehole centerline by said angle $\alpha$;

a second concentric stabilizer, having a preselected diameter slightly smaller than the diameter of the borehole, mounted at a preselected distance from said first concentric stabilizer on the drillstring, said drillstring being concentrically located therein; and a third concentric stabilizer, having a preselected diameter slightly smaller than the diameter of the borehole, mounted at a preselected distance from said second concentric stabilizer on the drillstring, said drillstring being concentrically located therein;

wherein the angle $\alpha$ of the bend in the motor housing, and the diameter and placement of the concentric stabilizers are determined by the desired path of the borehole to be drilled, said system drilling a curved borehole when only the downhole motor is activated, and drilling a straight borehole when the downhole motor is activated and both the drillstring and downhole motor housing are rotated.

2. The system for controlled directional and straight drilling of a borehole of claim 1 further comprising a bearing housing connected between the drill bit and the downhole end of said downhole motor housing, the drive shaft of said downhole motor being concentrically located therein and connected to drive said drill bit, said first concentric stabilizer being mounted on said bearing housing at a distance less than five feet from the face of the drill bit.

3. The system for controlled directional and straight drilling of a borehole of claim 2 wherein the bend angle $\alpha$ of the downhole motor housing is one degree or less.

4. The system for controlled directional and straight drilling of a borehole of claim 1 further comprising a fourth concentric stabilizer located a preselected distance on the drillstring from the third stabilizer.

5. The system for controlled directional and straight drilling of a borehole of claim 1, wherein the bend angle $\alpha$ of the downhole motor housing is about one-quarter of one degree.

6. The system for controlled directional and straight drilling of a borehole of claim 1, wherein the bend angle $\alpha$ of the downhole motor housing is about one-half of one degree.

7. The system for controlled directional and straight drilling of a borehole of claim 1, wherein the bend angle $\alpha$ of the downhole motor housing is about three-quarters of one degree.

8. The system for controlled directional and straight drilling of a borehole of claim 5, or claim 6, or claim 7, wherein said first concentric stabilizer is placed at four and one-quarter feet from the face of the drill bit.

9. The system for controlled directional and straight drilling of a borehole of claim 8, wherein said second concentric stabilizer is placed at thirty-one feet from said first concentric stabilizer.

10. The system for controlled directional and straight drilling of a borehole of claim 9, wherein said third concentric stabilizer is placed at forty-five feet from said second concentric stabilizer.

11. The system for controlled directional and straight drilling of a borehole of claim 9, wherein said third concentric stabilizer is placed thirty-five feet from said second concentric stabilizer.

12. The system for controlled directional and straight drilling of a borehole of claim 1, wherein said first concentric stabilizer is placed at four and one-quarter feet from the face of the drill bit.

13. The system for controlled directional and straight drilling of a borehole of claim 12, wherein said second concentric stabilizer is placed at thirty-one feet from said first concentric stabilizer.

14. The system for controlled directional and straight drilling of a borehole of claim 13, wherein said third concentric stabilizer is placed at forty-five feet from said second concentric stabilizer.

15. The system for controlled directional and straight drilling of a borehole of claim 13, wherein said third concentric stabilizer is placed at thirty-five feet from said second concentric stabilizer.

16. The system for controlled directional and straight drilling of a borehole of claim 14 or claim 15, wherein said first, second and third concentric stabilizers are 0.032 inches smaller than the borehole.

17. The system for controlled directional and straight drilling of a borehole of claim 14 or claim 15, wherein said first concentric stabilizer is 0.157 inches smaller than the borehole and said second and third stabilizers are 0.032 inches smaller than the borehole.

18. The system for controlled directional and straight drilling of a borehole of claim 14 or claim 15, wherein said first concentric stabilizer is 0.282 inches smaller than the borehole and said second and third stabilizers are 0.032 inches smaller than the borehole.

19. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole side connected to the drillstring, comprising the steps of:

1. selecting the placement and diameter of three concentric stabilizers on the drillstring as follows, the first concentric stabilizer being placed less than five feet from the face of the drill bit and having a slightly smaller diameter than the borehole, the second concentric stabilizer being placed a predetermined distance from the first stabilizer and having a slightly smaller diameter than the borehole, the third concentric stabilizer being placed a predetermined distance from the second stabilizer and having a slightly smaller diameter than the borehole;

2. selecting a predetermined weight on bit;

whereby the assembled concentrically stabilized drillstring with the selected weight on the bit exhibit a certain build angle or drop angle characteristic;

3. selecting a bend angle under two degrees;

4. placing the bend angle in the drillstring between the downhole motor and the drill bit on the uphole side of said first concentric stabilizer;

whereby said first concentric stabilizer and said selected bend angle exhibit a certain build angle characteristic, the concentrically stabilized drillstring with the selected weight on bit and the selected bend angle combining to form an interacting bottomhole assembly having a certain build angle or drop angle characteristic uniquely suited to the well plan; and 5. steering said unique downhole assembly by:

(a) turning the drillstring to point the bend in the drillstring and the bit in the direction the borehole should follow;

(b) activating the downhole motor while keeping the drillstring stationary when it is desired to drill along a curved path, as determined by the bend angle and first concentric stabilizing combination;

(c) rotating the drillstring and downhole motor while activating the downhole motor to turn the drill bit when it is desired to drill along a straight path.

*20. An improved steerable system for controlled directional and straight drilling of a borehole wherein the entire drillstring is rotatable from the surface, including a bottomhole assembly comprised of a drill bit connected to the output shaft of a downhole motor for independent rotation from the drillstring, said downhole motor connected at its uphole end to the drillstring, the improvement in the bottomhole assembly comprising:*

*a concentric stabilizer, having a preselected diameter slightly smaller than the diameter of the borehole, mounted at a preselected distance from the drill bit, the output shaft of said downhole motor being concentrically located within the concentric stabilizer; and*

*a bent housing connected above said concentric stabilizer and having a bend from its geometric center at a predetermined bend angle $\alpha$, thereby offsetting the centerline of said concentric stabilizer and the centerline of the drill bit face from the borehole centerline by said predetermined bend angle $\alpha$;* wherein the predetermined bend angle $\alpha$ of the bend in the bent housing, and the diameter and placement of the concentric stabilizer are determined by the desired path of the borehole to be drilled, said system drilling a curved borehole when only the downhole motor is activated, and drilling a straight borehole when the downhole motor is activated and the drillstring is rotated.

*21. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of a concentric stabilizer, the concentric stabilizer being placed close to the face of the drill bit and having a slightly smaller*

*diameter than the borehole, the output shaft of said downhole motor being concentrically located within the concentric stabilizer;*

*2. selecting a predetermined weight on the drill bit; whereby the assembled concentrically stabilized bottomhole assembly with the weight on the drill bit exhibits a certain build angle or drop angle characteristic;*

*3. selecting bend angle;*

*4. placing the bend angle above the drill bit on the uphole end of said concentric stabilizer;* whereby said concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and

*5. steering said unique bottomhole assembly by:*

*(a) turning the drillstring to point the drill bit in the desired direction the borehole should follow and activating the downhole motor while keeping the drillstring stationary when it is desired to drill along a curved path, as determined by the bend angle and concentric stabilizer combination;*

*(b) rotating the drillstring while activating the downhole motor to turn the drill bit when it is desired to drill along a straight path.*

*22. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of a concentric stabilizer, the concentric stabilizer being placed close to the face of the drill bit and having a slightly smaller diameter than the borehole, the output shaft of said downhole motor being concentrically located within the concentric stabilizer;*

*2. selecting a predetermined weight on the drill bit;* whereby the assembled concentrically stabilized bottomhole assembly with the weight on the drill bit exhibits a certain build angle or drop angle characteristic;

*3. selecting bend angle;*

*4. placing the bend angle above the drill bit on the uphole end of said concentric stabilizer;* whereby said concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and

*5. steering said unique bottomhole assembly by activating the downhole motor and selectively rotating the drillstring.*

*23. An improved system for controlled directional and straight drilling of a borehole wherein the entire drillstring is rotatable from the surface, including a bottomhole assembly comprised of a drill bit connected to the output shaft of a downhole motor for independent rotation from the drillstring, said downhole motor connected at its uphole end to the drillstring, the improvement int he bottomhole assembly comprising:*

*a first concentric stabilizer, having a preselected diameter slightly smaller than the diameter of the borehole, mounted at a preselected distance from the drill bit, the output shaft of said downhole motor being concentrically located within the first concentric stabilizer;* a bent housing connected above said first concentric stabilizer and having a bend from its geometric center at a predetermined bend angle $\alpha$, thereby offsetting the centerline of said first concentric stabilizer and the centerline of the drill bit face from the borehole centerline by said predetermined bend angle $\alpha$; and a second concentric stabilizer, having a preselected diameter slightly smaller than the diameter of the borehole, mounted at a preselected distance above said first concentric stabilizer;

wherein the predetermined bend angle $\alpha$ of the bend in the bent housing, and the diameter and placement of the concentric stabilizers are determined by the desired path of the borehole to be drilled, said system drilling a curved borehole when only the downhole motor is activated, and drilling a straight borehole when the downhole motor is activated and the drillstring is rotated.

*24. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of two concentric stabilizers as follows, the first concentric stabilizer being placed close to the face of the drill bit and having a slightly smaller diameter than the borehole, the output shaft of said downhole motor being concentrically located within the first concentric stabilizer, and the second concentric stabilizer being placed a predetermined distance above the first concentric stabilizer and having a slightly smaller diameter than the borehole;*

*2. selecting a predetermined weight on the drill bit; whereby the assembled concentrically stabilized bottomhole assembly with the weight on the drill bit exhibits a certain build angle or drop angle characteristic;*

*3. selecting bend angle;*

*4. placing the bend angle above the drill bit on the uphole end of said first concentric stabilizer;* whereby said first concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and

*5. steering said unique bottomhole assembly by:*

*(a) turning the drillstring to point the drill bit in the desired direction the borehole should follow and activating the downhole motor while keeping the drillstring stationary when it is desired to drill along a curved path, as determined by the bend angle and first concentric stabilizer combination;*

*(b) rotating the drillstring while activating the downhole motor to turn the drill bit when it is desired to drill along a straight path.*

*25. A method for controlled directional and straight drilling of a borehole, according to a predetermined well plan, utilizing a bottomhole assembly connected to a drillstring comprising a drill bit connected for independent*

*rotation from said drillstring to the output shaft of a downhole motor having its uphole end connected to the drillstring, comprising the steps of:*

*1. selecting the placement and diameter of two concentric stabilizers as follow, the first concentric stabilizer being placed close to the face of the drill bit and having a slightly smaller diameter than the borehole, the output shaft of said downhole motor being concentrically located within the first concentric stabilizer, and the second concentric stabilizer being placed a predetermined distance above the first concentric stabilizer and having a slightly smaller diameter than the borehole;*

*2. selecting a predetermined weight on the drill bit; whereby the assembled concentrically stabilized bottomhole assembly with the weight on the drill bit exhibits a certain build angle or drop angle characteristic;*

*3. selecting bend angle;*

*4. placing the bend angle above the drill bit on the uphole end of said first concentric stabilizer;* whereby said first concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and

*5. steering said unique bottomhole assembly by activating the downhole motor and selectively rotating the drillstring.*

*26. An improved steerable system for controlled directional and straight drilling of a borehole wherein the entire drillstring is rotatable from the surface, including a bottomhole assembly comprised of a drill bit connected to the output shaft of a downhole motor for independent rotation from the drillstring, said downhole motor connected at its uphole end to the drillstring, the improvement in the bottomhole assembly comprising:*

*a concentric stabilizer, having a preselected diameter slightly smaller than the diameter of the borehole, mounted at a preselected distance from the drill bit, the output shaft of said downhole motor being concentrically located within the concentric stabilizer; and*

*a bent housing connected above said concentric stabilizer and having a bend from its geometric center at a predetermined bend angle α, said bend angle α being oriented in substantially a single direction from the borehole centerline, thereby offsetting the centerline of said concentric stabilizer and the centerline of the drill bit face from the borehole centerline by said predetermined bend angle α;* wherein the predetermined bend angle α of the bend in the bent housing, and the diameter and placement of the concentric stabilizer are determined by the desired path of the borehole to be drilled, said system drilling a curved borehole when only the downhole motor is activated, and drilling a straight borehole when the downhole motor is activated and the drillstring is rotated.

*27. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of a concentric stabilizer, the concentric stabilizer being placed close to the face of the drill bit and having a slightly smaller diameter than the borehole, the output shaft of said downhole motor being concentrically located within the concentric stabilizer;*

*2. selecting a predetermined weight on the drill bit; whereby the assembled concentrically stabilized bottomhole assembly with the weight on the drill bit exhibits a certain build angle or drop angle characteristic;*

*3. selecting bend angle oriented in substantially a single direction from the centerline of the borehole;*

*4. placing the bend angle above the drill bit on the uphole end of said concentric stabilizer;*

*whereby said concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and*

*5. steering said unique bottomhole assembly by:*

*(a) turning the drillstring to point the drill bit in the desired direction the borehole should follow and activating the downhole motor while keeping the drillstring stationary when it is desired to drill along a curved path, as determined by the bend angle and concentric stabilizer combination;*

*(b) rotating the drillstring while activating the downhole motor to turn the drill bit when it is desired to drill along a straight path.*

*28. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of a concentric stabilizer, the concentric stabilizer being placed close to the face of the drill bit and having a slightly smaller diameter than the borehole, the output shaft of said downhole motor being concentrically located within the concentric stabilizer;*

*2. selecting a predetermined weight on the drill bit; whereby the assembled concentrically stabilized bottomhole assembly with the weight on the drill bit exhibits a certain build angle or drop angle characteristic;*

*3. selecting bend angle oriented in substantially a single direction from the centerline of the borehole;*

*4. placing the bend angle above the drill bit on the uphole end of said concentric stabilizer;*

*whereby said concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and*

*5. steering said unique bottomhole assembly by activating the downhole motor and selectively rotating the drillstring.*

*29. An improved system for controlled directional and straight drilling of a borehole wherein the entire drillstring is rotatable from the surface, including a bottomhole assembly comprised of a drill bit connected to the output*

*shaft of a downhole motor for independent rotation from the drillstring, said downhole motor connected at its uphole end to the drillstring, the improvement in the bottomhole assembly comprising:*

*a first concentric stabilizer, having a preselected diameter slightly smaller than the diameter of the borehole, mounted at a preselected distance from the drill bit, the output shaft of said downhole motor being concentrically located within the first concentric stabilizer;*

*a bent housing connected above said first concentric stabilizer and having a bend from its geometric center at a predetermined bend angle α, said bend angle α being oriented in substantially a single direction from the borehole centerline, thereby offsetting the centerline of said first concentric stabilizer and the centerline of the drill bit face from the borehole centerline by said predetermined bend angle α; and*

*a second concentric stabilizer, having a preselected diameter slightly smaller than the diameter of the borehole, mounted at a preselected distance above said first concentric stabilizer;*

*wherein the predetermined bend angle α of the bend in the bent housing, and the diameter and placement of the concentric stabilizers are determined by the desired path of the borehole to be drilled, said system drilling a curved borehole when only the downhole motor is activated, and drilling straight borehole when the downhole motor is activated and the drillstring is rotated.*

*30. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of two concentric stabilizers as follows, the first concentric stabilizer being placed close to the face of the drill bit and having a slightly smaller diameter than the borehole, the output shaft of said downhole motor being concentrically located within the first concentric stabilizer, and the second concentric stabilizer being placed a predetermined distance above the first concentric stabilizer and having a slightly smaller diameter than the borehole;*

*2. selecting a predetermined weight on the drill bit;*

*whereby the assembled concentrically stabilized bottomhole assembly with the weight on the drill bit exhibits a certain build angle or drop angle characteristic;*

*3. selecting bend angle oriented in substantially a single direction from the centerline of the borehole;*

*4. placing the bend angle above the drill bit on the uphole end of said first concentric stabilizer;*

*whereby said first concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and*

*5. steering said unique bottomhole assembly by:*

*(a) turning the drillstring to point the drill bit in the desired direction the borehole should follow and activating the downhole motor while keeping the drillstring stationary when it is desired to drill along a curved path, as determined by the bend angle and first concentric stabilizer combination;*

*(b) rotating the drillstring while activating the downhole motor to turn the drill bit when it is desired to drill along a straight path.*

*31. A method for controlled directional and straight drilling of a borehole, according to a predetermined well plan, utilizing a bottomhole assembly connected to a drillstring comprising a drill bit connected for independent rotation from said drillstring to the output shaft of a downhole motor having its uphole end connected to the drillstring, comprising the steps of:*

*1. selecting the placement and diameter of two concentric stabilizers as follows, the first concentric stabilizer being placed close to the face of the drill bit and having a slightly smaller diameter than the borehole, the output shaft of said downhole motor being concentrically located within the first concentric stabilizer, and the second concentric stabilizer being placed a predetermined distance above the first concentric stabilizer and having a slightly smaller diameter than the borehole;*

*2. selecting a predetermined weight on the drill bit;*

*whereby the assembled concentrically stabilized bottomhole assembly with the weight on the drill bit exhibits a certain build angle or drop angle characteristic;*

*3. selecting bend angle oriented in substantially a single direction from the centerline of the borehole;*

*4. placing the bend angle above the drill bit on the uphole end of said first concentric stabilizer;*

*whereby said first concentric stabilizer and said bend angle exhibit a certain build angle characteristic, the concentrically stabilized bottomhole assembly with the weight on the drill bit and the bend angle combining to form an interacting bottomhole assembly having a certain build angle or drop angle characteristic uniquely suited to the well plan; and*

*5. steering said unique bottomhole assembly by activating the downhole motor and selectively rotating the drillstring.*

*32. A component for a steerable bottomhole assembly for controlled drilling of a borehole, said component comprising:*

*a downhole motor having a centerline, an uphole end and a downhole end and a motor housing substantially surrounding said downhole motor;*

*said uphole end of said downhole motor including means for connecting said downhole motor to a drillstring;*

*said downhole end of said downhole motor including means for connecting said downhole motor to a drill bit;*

*said means for connecting said downhole motor to a drill bit including a bent housing and a bearing assembly;*

*said bearing assembly including a bearing housing, and an output shaft with said output shaft being concentrically located within said bearing housing;*

*a first concentric stabilizer, having a diameter slightly smaller than the diameter of the borehole and a centerline;*

*said first concentric stabilizer being mounted at a distance below the bent housing; said output shaft of the bearing assembly being concentrically located within the first concentric stabilizer;*

*said bent housing having a single bend in one direction located above the first concentric stabilizer and locate below the downhole motor at a bend angle α, thereby offsetting the centerline of said first concentric stabilizer from the centerline of said downhole motor by said bend angle α;*

*a second concentric stabilizer, having a diameter slightly smaller than the diameter of the borehole and a centerline;*

*said second concentric stabilizer being mounted above said first concentric stabilizer and said bent housing;*

*said centerline of said second concentric stabilizer being offset from the centerline of the first concentric stabilizer by said bend angle α;*

*said component for a steerable bottomhole assembly being adapted to aid in steering said bottomhole assembly when activating the downhole motor and selectively rotating the drillstring.*

*33. A component for a steerable bottomhole assembly for controlled drilling of a borehole, said component comprising:*

*a downhole motor having a centerline, an uphole end and a downhole end and a motor housing substantially surrounding said downhole motor;*

*said uphole end of said downhole motor including means for connecting said downhole motor to a drillstring;*

*said downhole end of said downhole motor including means for connecting said downhole motor to a drill bit;*

*said means for connecting said downhole motor to a drill bit including a bent housing and a bearing assembly;*

*said bearing assembly including a bearing housing, and an output shaft with said output shaft being concentrically located within said bearing housing;*

*a first concentric stabilizer, having a diameter slightly smaller than the diameter of the borehole and a centerline;*

*said first concentric stabilizer being mounted at a distance below the bent housing; said output shaft of the bearing assembly being concentrically located within the first concentric stabilizer;*

*said bent housing having a single bend in one direction located above the first concentric stabilizer and located below the downhole motor at a bend angle α, thereby offsetting the centerline of said first concentric stabilizer from the centerline of said downhole motor by said bend angle α;*

*said component for a steerable bottomhole assembly being adapted to aid in steering said bottomhole assembly when activating the downhole motor and selectively rotating the drillstring.*

*34. The component for a steerable bottomhole assembly for controlled drilling of a borehole of claims 32 or 33 wherein said bent housing has a bend angle α of one degree or less.*

*35. A component for a steerable bottomhole assembly for controlled drilling of a borehole, said component comprising:*

*a downhole motor having a centerline, an uphole end, and a downhole end, and a motor housing substantially surrounding said downhole motor;*

*said uphole end of said downhole motor including means for connecting said downhole motor to a drillstring;*

*said downhole end of said downhole motor including means for connecting said downhole motor to a drill bit;*

*said means for connecting said downhole motor to a drill bit including a bent housing and a bearing assembly;*

*said bearing assembly including a bearing housing, and an output shaft with said output shaft being concentrically located within said bearing housing;*

*means for stabilizing said component for a steerable bottomhole assembly;*

*said means for stabilizing said component for a steerable bottomhole assembly consisting of a first concentric stabilizer having a diameter slightly smaller than the diameter of the borehole and a centerline, said first concentric stabilizer being mounted at a distance below the bent housing, said output shaft of said bearing assembly being concentrically located within the first concentric stabilizer;*

*said bent housing having a single bend in one direction located above the first concentric stabilizer and located below the downhole motor at a bend angle α, thereby offsetting the centerline of said first concentric stabilizer from the centerline of said downhole motor by said bend angle α;*

*said component for a steerable bottomhole assembly being adapted to aid in steering said bottomhole assembly when activating the downhole motor and selectively rotating the drillstring.*

*36. A component for a steerable bottomhole assembly for controlled drilling of a borehole, said component comprising:* a downhole motor having a centerline, an uphole end, and a downhole end, and a motor housing substantially surrounding said downhole motor;

*said uphole end of said downhole motor including means for connecting said downhole motor to a drillstring;*

*said downhole end of said downhole motor including means for connecting said downhole motor to a drill bit;*

*said means for connecting said downhole motor to a drill bit including a bent housing and a bearing assembly;*

*said bearing assembly including a bearing housing, and an output shaft with said output shaft being concentrically located within said bearing housing;*

*means for stabilizing said component for a steerable bottomhole assembly;*

*said means for stabilizing said component for a steerable bottomhole assembly consisting of a first concentric stabilizer having a diameter slightly smaller than the diameter of the borehole and a centerline, said first concentric stabilizer being mounted at a distance below the bent housing, said output shaft of said bearing assembly being concentrically located within the first concentric stabilizer, and a second concentric stabilizer having a diameter slightly smaller than the diameter of the borehole and a centerline, said second concentric stabilizer being mount above said first concentric stabilizer and said bent housing;*

*said bent housing having a single bend in one direction located above the first concentric stabilizer and located below the downhole motor at a bend angle α, thereby offsetting the centerline of said first concentric stabilizer from the centerline of said downhole motor by said bend angle α;*

*said centerline of said second concentric stabilizer being offset from the centerline of said first concentric stabilizer by said bend angle α;*

*said component for a steerable bottomhole assembly being adapted to aid in steering said bottomhole assembly when activating the downhole motor and selectively rotating the drillstring.*

* * * * *

UNITED STATES PATENT AND TRADEMARK OFFICE

CERTIFICATE OF CORRECTION

PATENT NO. : Re. 33,751

DATED : November 26, 1991

INVENTOR(S) : Bela Geczy and Frank DeLucia

It is certified that error appears in the above—identified patent and that said Letters Patent is hereby corrected as shown below:

On the title page item [56] "References Cited" and under the heading "FOREIGN PATENT DOCUMENTS," change "593999" to --1593999--.

In Column 6, Line 5, change "4½" to --4½--.

In Column 10, Lines 51 through 58 should be in italics.

In Column 11, Lines 12 through 18, Lines 43 through 45, and Lines 49 through 55 should be in italics.

In Column 11, Line 65, change "int he" to --in the--.

In Column 12, Lines 4 through 22 and Lines 48 through 54 should be in italics.

In Column 13, Lines 22 through 28 and Lines 53 through 60 should be in italics.

In Column 16, Line 63, at the end of the line, change "locate" to --located--.

In Column 18, Lines 27 through 29 should be in italics.

In Column 18, Line 52, change "mount" to --mounted--.

Signed and Sealed this

Sixth Day of July, 1993

Michael K. Kirk

*Attest:*

MICHAEL K. KIRK

*Attesting Officer*

*Acting Commissioner of Patents and Trademarks*

US001033751B1

REEXAMINATION CERTIFICATE (3128th)

United States Patent [19] [11] B1 Re. 33,751

Geczy et al. [45] Certificate Issued Feb. 11, 1997

[54] SYSTEM AND METHOD FOR CONTROLLED DIRECTIONAL DRILLING

[75] Inventors: Bela Geczy, Houston, Tex.; Frank DeLucia, Aberdeen, Scotland

[73] Assignee: Halliburton Company, Duncan, Okla.

Reexamination Request:
No. 90/003,908, Aug. 4, 1995

Reexamination Certificate for:

| | |
|---|---|
| Patent No.: | **Re. 33,751** |
| Issued: | **Nov. 26, 1991** |
| Appl. No.: | **356,270** |
| Filed: | **May 23, 1989** |

Certificate of Correction issued Jul. 6, 1993.

Related U.S. Patent Documents

Reissue of:

| | |
|---|---|
| [64] Patent No.: | **4,667,751** |
| Issued: | **May 26, 1987** |
| Appl. No.: | **786,817** |
| Filed: | **Oct. 11, 1985** |

[51] Int. Cl.[6] ..... E21B 7/08

[52] U.S. Cl. ..... 175/61; 175/73; 175/75; 175/76

[58] Field of Search ..... 175/61, 73, 74, 175/75, 76

[56] References Cited

U.S. PATENT DOCUMENTS 4,189,012 2/1980 Garrett .
4,862,084 9/1989 Warren et al. .

OTHER PUBLICATIONS

"Drilco 1982–'83 Composite Catalog," *Composite Catalog of Oil Field Equipment & Services*, vol. 2, 1982–83, pp. 2761–2790.

Dyna–Drill Handbook 3rd, 4th and 5th Editions, 6 pages. (Date unknown).

Catalogs of Stabilizer Manufacturers other than Smith, from the 1982–83 *Composite Catalog of Oil Field Equipment & Services*, 6 pages.

*American Petroleum Institute Specification for Rotary Drilling Equipment* (hereafter API Spec. 7), Thirty–fourth Edition, May 28, 1984, 4 pages.

*Rotary Drilling—The Drill Stem*, Unit I, Lesson 3, 2nd Edition, 1981, 16 pages.

*Primary Examiner*—Terry Lee Melius

[57] ABSTRACT

A system and method for controlled directional drilling utilizes a system approach to design the hardware for drilling according to the well plan. The bend angle of a bent housing, connected between the bit and downhole motor, the diameter of a plurality of stabilizers and placement of the stabilizers with respect to the drill bit are selected and predetermined on the basis of the desired well plan. With the use of an MWD, the direction of the progressing borehole is tracked from the surface. Direction changes as required are controlled from the surface simply by controlling rotation of the drillstring. For curved path drilling, only the downhole motor is rotated, causing the borehole to travel along the curve determined by the bend angle in the bent housing and the diameter and location of the concentric stabilizers. When straight hole drilling is required, both the downhole motor and the entire drill string are rotated, effectively nullifying the effect of the bend angle in the bent housing.

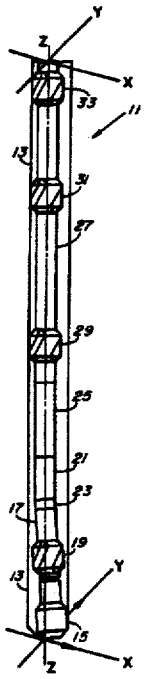

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–36 is confirmed.

* * * * *